United States Patent [19]

Ying et al.

[11] 4,446,255

[45] May 1, 1984

[54] SIZED CARBON FIBERS SUITABLE FOR USE IN COMPOSITES OF IMPROVED IMPACT RESISTANCE

[75] Inventors: Lincoln Ying, Bridgewater; Thomas P. Carter, Jr., Parsippany, both of N.J.

[73] Assignee: Celanese Corporation, New York, N.Y.

[21] Appl. No.: 454,326

[22] Filed: Dec. 29, 1982

[51] Int. Cl.³ .......................... B32B 9/00; B05D 3/02; C08K 3/04
[52] U.S. Cl. ..................... 523/205; 428/367; 428/408; 428/375; 428/413; 427/386; 524/495; 523/468
[58] Field of Search ............... 427/386, 389; 428/367, 428/375, 408, 413, 372; 525/65; 523/468, 205; 524/495

[56] References Cited

U.S. PATENT DOCUMENTS

| | | | |
|---|---|---|---|
| 3,496,250 | 2/1970 | Czerwinski | 525/65 |
| 3,837,904 | 9/1974 | Hill | 427/386 |
| 3,855,174 | 12/1974 | Brié et al. | 260/40 R |
| 3,914,504 | 10/1975 | Weldy | 428/367 |
| 3,931,354 | 1/1976 | Sheppard et al. | 260/836 |
| 3,957,716 | 5/1976 | Weldy | 260/37 EP |
| 4,220,686 | 9/1980 | Brook | 428/375 |

*Primary Examiner*—Marion McCamish
*Assistant Examiner*—B. K. Johnson
*Attorney, Agent, or Firm*—Herbert P. Price

[57] ABSTRACT

Improved carbon fibers are provided which may be employed in composites to improve the impact resistance thereof. The carbon fibers disclosed are coated with a sizing composition comprised of a blend of an epoxy resin formed by the reaction of epichlorohydrin and p-amino phenol and an acrylonitrile butadiene-styrene (ABS) graft copolymer.

12 Claims, No Drawings

SIZED CARBON FIBERS SUITABLE FOR USE IN COMPOSITES OF IMPROVED IMPACT RESISTANCE

REFERENCE TO RELATED APPLICATIONS

This application is related to application Ser. No. 454,327, filed Dec. 29, 1982, entitled "Improved Blend of Epoxy Resin and Acrylonitrile Butadiene-Styrene Graft Copolymers and Method of Production Thereof" of Thomas P. Carter, Jr.

BACKGROUND OF THE INVENTION

In the search for high performance materials, considerable interest has been focused upon carbon fibers. Industrial high performance materials of the future are projected to make substantial utilization of fiber-reinforced composites, and carbon fibers theoretically have among the best properties of any fiber for use as high strength reinforcement. Among these desirable properties are corrosion and high temperature resistance, low density, high tensile strength, and high modulus.

Polymeric materials heretofore commonly have been selected as the matrix material in which the relatively delicate carbon fibers are incorporated to form high performance materials with the carbon fibers serving as a light weight fibrous reinforcement. Epoxy resins most frequently have been selected as the matrix material. Additionally, the use of polyimides as the matrix material has been proposed primarily because of the ability of the polyimides to withstand even higher temperatures during use.

In order to improve the handleability of the carbon fibers without undue fiber damage during the formation of composite articles, it has been the common practice to apply a flexible size or finish to the surface of the same. See, for instance, the epoxy size disclosed in U.S. Pat. Nos. 3,837,904; 3,914,504; and 3,957,716. The sized carbon fibers bearing the epoxy coating are commonly incorporated in an epoxy matrix resin and a rigid composite article is formed upon curing.

There has remained a need, however, for a size or finish for use with carbon fibers which is capable of enhancing the handleability of the fiber which at the same time improve the impact resistance of the composites employing the fiber as a reinforcing agent.

OBJECTS AND SUMMARY OF THE INVENTION

It is an object of the present invention to provide sized carbon fibers which may be readily handled without undue fuzz formation or damage to the same.

It is an object of the present invention to provide improved sized carbon fibers which when incorporated into a composite structure produce a structure which exhibits enhanced impact resistance.

It is an object of the present invention to provide improved sized carbon fibers which are particularly suited for use in the formation of composite structures.

It is an object of the present invention to provide improved sized carbon fibers which readily undergoing impregnation with a matrix material.

It is a further object of the present invention to provide an improved carbon fiber reinforced composite structure comprising a polymeric matrix and a size on the carbon fibers which do not result in a substantial diminution in the overall physical properties of the composite structure.

These and other objects, as well as the scope, nature, and utilization of the claimed invention will be apparent to those skilled in the art from the following detailed description and appended claims.

In accordance with one aspect of the present invention, a carbon fiber is provided having a coating on the surface thereof in a concentration of about 0.5 to 3.0 percent by weight based upon the weight of the carbon fiber of a sizing composition which comprises as a first component an epoxy resin comprising the reaction product of epichlorohydrin and p-amino phenol and a second component consisting of an acrylonitrile butadiene-styrene graft copolymer.

In accordance with another aspect of the present invention, a composite structure is provided comprising a rigid polymeric matrix having carbon fibers incorporated therein which are coated on the surface thereof with about 0.5 to 3.0 percent by weight based upon the weight of the carbon fibers of the sizing composition defined above.

DETAILED DESCRIPTION OF THE INVENTION

The carbon fibers which are provided with a protective size coating in accordance with the present invention contain at least about 90 percent carbon by weight (e.g., at least about 95 percent carbon by weight in preferred embodiments) and such carbon may be either amorphous or graphitic in nature. Suitable carbon fibers are commercially available and commonly are of a relatively low denier per filament of approximately 0.5 to 2 thereby rendering the fibers susceptible to damage during handling in the absence of a satisfactory size coating, particularly if the fibers also possess a relatively high Young's modulus. Representative carbon fibers are disclosed in commonly-assigned U.S. Pat. Nos. 3,775,520; 3,900,556; 3,925,524; and 3,954,950.

The carbon fibers prior to sizing may optionally have their surface characteristics modified so as to improve their ability to bond to a resinous matrix material. Representative surface modification processes are disclosed in U.S. Pat. Nos. 3,657,082; 3,671,411; 3,723,150; 3,723,607; 3,754,957; 3,759,805; 3,859,187; 3,894,884; and in commonly-assigned U.S. Pat. application Ser. No. 222,970, filed Jan. 5, 1981.

The carbon fibers prior to sizing are preferably provided as a multifilamentary fibrous material such as a continuous length of a multifilamentary yarn, tow, strand, tape, etc. However, staple carbon fibers or other fibrous assemblages may be satisfactorily sized through the use of the present invention. For best results the configuration of the carbon fibers is such that the surfaces of the individual fibers are substantially exposed when the size composition is applied.

As previously noted, the carbon fibers are provided with a flexible coating on the surface thereof which comprises as a first component an epoxy resin comprising the reaction product of epichlorohydrin and p-amino phenol and a second component consisting of an acrylonitrile butadiene-styrene graft copolymer (ABS).

Physical blends of epoxy resins and acrylonitrile butadiene-styrene resins are known. See, for example, U.S. Pat. Nos. 2,879,252; 3,322,852, 3,322,853; 3,496,250; 3,923,922; and 4,117,038. However, while ABS graft copolymers are generally not compatible with epoxy resins, a surprising and significant characteristic of the ABS graft copolymer is its ability to readily disperse and be at least partially soluble in an epoxy resin formed by the reaction of epichlorohydrin and p-amino phenol.

Furthermore, once the ABS graft copolymer is dispersed and at least partially dissolved in the epoxy resin formed by the reaction of epichlorohydrin and p-amino phenol, additional epoxy resins can be admixed with the epoxy-ABS mixture which otherwise would not be compatible with the ABS graft copolymer, with the ABS graft copolymer remaining in a dispersed solution-like state and not separating from the admixture. Such a result is indeed surprising and enables the ABS graft copolymer to be blended with a variety of epoxy resins with which it previously had not been known to be compatible and could otherwise not be employed in the present invention.

An epoxy resin produced by the reaction of epichlorohydrin and p-amino phenol is considered to exhibit a relatively low viscosity (i.e., on the order of 500 to 900 centipoise). Such a physical characteristic is believed to assist in the dispersal of the ABS graft copolymer therein although it is not believed to be totally responsible therefor.

Exemplary of such epoxy resins are those disclosed in U.S. Pat. No. 2,951,825, herein incorporated by reference in its entirety. For example, the patent discloses triglycidyl derivatives of p-amino phenol formed by reacting an amino phenol with epichlorohydrin in the presence of a lithium catalyst to produce the corresponding chlorohydrin of the amino phenol. The chlorohydrin is then dehydrochlorinated to form the desired polyglycidyl derivative of the amino phenol. Such epoxy resins are well-known in the art and are marketed commercially by Ciba-Geigy under the tradename Araldite 0500 and 0510.

A variety of ABS graft copolymers may be employed in practice of the present invention. The specific graft polymers utilized in this invention are prepared by first polymerizing a conjugated diene, such as butadiene, or a conjugated diene in the presence of a monovinyl aromatic hyrdocarbon such as styrene, as to provide a polymerized diene rubbery backbone such as polybutadiene or a butadiene-styrene copolymer backbone. Thereafter, a second monomer or group of monomers are grafted onto the rubbery backbone to complete the graft polymer. This is accomplished by the addition and interaction under polymerization conditions of an acrylonitrile, substituted acrylonitrile, or an acrylic acid ester and a monovinyl aromatic hydrocarbon exemplified, respectively, by acrylonitrile or methyl methacrylate and styrene.

The backbone, i.e., a conjugated diene polymer or copolymer, is prepared so as to comprise from about 10 percent to about 60 percent by weight of the total composition and the acrylonitrile, substituted acrylonitrile or acrylic acid ester and the monovinyl aromatic hydrocarbon that is polymerized in the presence of the backbone polymer or copolymer comprises from about 40 percent to about 90 percent by weight of the total composition.

The acrylonitrile, substituted acrylonitrile, or acrylic acid ester preferably comprises from about 5 percent to about 45 percent by weight of the three-component organic mixture and the monovinyl aromatic hydrocarbon comprises from about 30 percent to about 80 percent of the total composition. The term monovinyl aromatic hydrocarbon is meant to include compounds such as styrene, alpha-methylstyrene, vinyltoluene, vinylxylene, ethylvinylbenzene, isopropylstyrene, chlorostyrene, dichlorostyrene, ethylchlorostyrene, mixtures thereof and the like. The terms acrylonitrile, substituted acrylonitrile and acrylic acid ester compounds are meant to include compounds such as acrylonitrile, methacrylonitrile, ethacrylonitrile, chloroacrylonitrile, methyl methacrylate, ethyl methacrylate, propyl methylacrylate, etc., mixtures thereof and the like.

The ABS-epoxy blend may be formed by admixing the ABS graft copolymer with the epoxy resin while stirring or otherwise admixing the components under melt conditions. It is preferable to conduct such admixing under elevated temperature conditions (e.g., 135° to 150° C.) in order to decrease the viscosity of both the epoxy resin and ABS graft copolymer. Incremental addition of the ABS graft copolymer to the epoxy resin generally enhances the ease of dispersal of the copolymer in the epoxy resin.

The two components can be combined in various proportions depending upon the physical characteristics desired in the final product. Generally, weight ratios of ABS graft copolymer to epoxy resin ranging from about 1:99 to 99:1 have been found to be suitable. Ratios of 1:4 to 4:1 are particularly preferred.

If desired, a reactive crosslinking agent can be utilized to crosslink (i.e., cure) the blend although such an aspect is not preferred. Known cross-linking agents such as polyamines, e.g., triethylenetetramine, boron trifluorideamine complex, dibasic acid anhydride, substituted imidazoles, phenolics, and substituted phenol catalysts, and urea resins are suitable. The curing agent may be present in amounts ranging from about one percent by weight to about ninety percent by weight of the blend depending upon the specific curing agent and epoxy resins being utilized. Lewis acid curing agents, such as stannous chloride and boron trifluoride require relatively low amounts, i.e., from about one to about five percent, whereas the amine complexes may require from four to fifteen percent and the carboxylated materials, e.g., carboxy terminated butadiene and methacrylic acid, as well as polyamides, such as those prepared by condensation of polymerized unsaturated acid with diamines, may require as much as fifty to ninety percent by weight.

Subsequent to formation of the epoxy-ABS graft copolymer composition, the composition can be hot melt processed without the additional use of solvents. Other types of conventional thermosetting (e.g., epoxy) resins can also be added thereto to enhance various characteristics of the resulting product without causing the ABS graft copolymer to separate from the admixture. Such a result is indeed surprising and deemed to be a major advantage of the invention. Such additional epoxy resins include but are not limited to the reaction products of epichlorohydrin and polyhydric compounds such as glycerin and bisphenol.

A sizing solution can be prepared by adding the epoxy-ABS admixture into a container together with acetone to produce a 2 to 5 percent solution with stirring by means of a magnetic stirrer.

The solution which is capable of forming the size coating may be applied to the carbon fibers by any suitable technique such as dipping, padding, etc. The solution preferably is provided at a temperature of approximately room temperature (e.g. approximately 25° C.) when applied to the carbon fibers. Once the solution is applied, the solvent contained therein is substantially volatilized by heating in an appropriate zone which is provided at a more highly elevated temperature. The temperature of such zone will be influenced by the boiling point of the solvent selected and preferably does not exceed approximately 150° to 160° C. Heating times of approximately 2 minutes have been found to be satisfactory. Appropriate equipment and safety precautions must be taken to insure the safety of personnel in the area and to effectively deal with the explosion hazard created by solvent vapors. Every effort is made to remove the solvent to the fullest extent possible.

Upon volatilization of the solvent the size coating is deposited upon the surface of the carbon fiber in a concentration of about 0.5 to 3.0 percent by weight based upon the weight of the carbon fiber, and most preferably in a concentration of about 1.1 to 1.5 percent by weight based upon the weight of the carbon fiber.

The carbon fiber bearing the flexible size coating in accordance with the present invention may be handled without undue damage. The fuzz problem which commonly exists when one attempts to process continuous lengths of unsized carbon fibers is significantly reduced. Bundles of carbon fibers bearing the size coating are amenable to flattening and spreading thereby facilitating ready impregnation of the same by the matrix resin during the formation of a composite structure in accordance with standard technology. Such impregnation is believed to result in composite structures possessing improved mechanical properties. Carbon fiber bundles bearing the size of the present invention can be woven without any substantial damage to the relatively delicate carbon fibers.

The sized carbon fibers may be impregnated with the composition which forms the matrix resin in a suitable manner such as (1) by contact with a resin film followed by heat and pressure, (2) by pulling through a bath containing molten matrix-forming components, or (3) by coating with a resin solution containing a low boiling solvent which is subsequently removed by passing the coated fibers through a heated oven.

The sized carbon fibers following curing preferably are provided in the polymeric matrix resin in a concentration of approximately 50 to 75 percent by weight and most preferably in a concentration of approximately 60 to 65 percent by weight based upon the total weight of the final composite structure.

The resulting composite articles can be utilized as strong lightweight structural components which are capable of service at elevated temperature (e.g., 95° to 205° C.). For instance, the composite articles may serve in aerospace components, particularly for skin structures, such as primary and secondary structures on aircraft.

The following examples are presented as a specific illustration of the claimed invention. It should be understood, however, that the invention is not limited to the specific details set forth in the examples.

EXAMPLE 1

The carbon fiber selected for sizing was a yarn of carbonaceous filamentary material derived from an acrylonitrile copolymer consisting of approximately 98 mole percent of acrylonitrile units and 2 mole percent of methylacrylate units. The carbonaceous material consisted of about 6000 substantially parallel filaments, containing about 93 percent carbon by weight, commercially available from the Celanese Corporation under the designation of Celion 6000. Representative average filament properties for the carbon fiber include a denier of 0.6, a tensile strength of approximately 470,000 psi, a Young's modulus of approximately 34 million psi, and an elongation of approximately 1.4 percent.

To a vessel were added, at a temperature ranging from 120° to 150° C., with stirring, 50 parts by weight of a thermoplastic ABS resin obtained from USS Chemicals under the designation K-3462 (added incrementally) to 100 parts by weight of an epoxy resin available from Ciba-Geigy under the trade designation Araldite 0510. The mixed product is then added to acetone to form a 3 percent solution with stirring by a magnetic stirrer.

The resulting dilute size solution was applied to the carbon fiber. More specifically, the sizing of the continuous length of the carbon fibers was accomplished by dipping and being passed in the direction of its length at a rate of 5 meters per minute through a metal trough containing the sizing solution at room temperature, followed by passage through two rows of rubber rollers which removed the excess from the fiber bundle.

The solvent next was removed from the surface of the carbon fibers by drying for two minutes in a circulating air oven at 110° C. A flexible coating was provided on the surface of the carbon fiber in a concentration of about 1.2 percent by weight, which imparted highly improved handling characteristics to the carbon fibers while significantly reducing the fuzz level.

The sized carbon fiber was capable of spreading to accommodate impregnation with a standard epoxy matrix resin system (100 parts by weight of Epi-Rez 508 to 22.5 parts by weight of Epi-Cure 841 available from Celanese Corporation). The composite was formed by use of a 3 inch prepreg with laminates being fabricated by match-metal-die molding techniques using a 95° C. cure for 5 minutes and at 5 psi. followed by 165° C. for 45 minutes at 50 psi. during the formation of a carbon fiber reinforced composite structure. The mechanical properties of the composite were determined by standard ASTM procedures and summarized in Tables I and II.

EXAMPLE 2

The procedure of Example 1 was repeated with the exception that 400 parts by weight of an epoxy resin available from Shell Chemical Co. under the trade designation Epon 828 are added to 150 parts by weight of the sizing composition produced in Example 1 to dilute the ABS concentration to 10 parts ABS in 100 parts of epoxy. A 3 percent solution in acetone was then prepared and a composite structure produced. The mechanical properties of the composite were determined by standard ASTM procedures and summarized in Tables I and II.

COMPARATIVE EXAMPLE

The procedure of Example 1 was repeated with the exception that the ABS resin was not employed. The mechanical properties of the composite thus produced were determined by standard ASTM procedures and are summarized in Tables I and II.

TABLE I

| | Mechanical Properties of Composites | | | |
| --- | --- | --- | --- | --- |
| | Short Beam Shear | | Impact Strength | |
| Sample | Room Temperature (MPa) | 200° F. (MPa) | $P_i$ (N) | $P_f$ (N) |
| Comparative | 95.86 | 57.24 | 1188 | 1481 |

TABLE I-continued

| | Mechanical Properties of Composites | | | |
|---|---|---|---|---|
| | Short Beam Shear | | Impact Strength | |
| Sample | Room Temperature (MPa) | 200° F. (MPa) | $P_i$ (N) | $P_f$ (N) |
| Example | | | | |
| Example 1 | 86.90 | 57.24 | 1468 | 1926 |
| Example 2 | 85.52 | 56.55 | 1472 | 1939 |

Note:
Impact strength data is normalized to 0.060 inch composite thickness

TABLE II

| | Mechanical Properties of Composites | | | | | | | | | |
|---|---|---|---|---|---|---|---|---|---|---|
| | Tensile | | | | 0° Flexural | | | 90° Flexural | | |
| | Room Temp. | | 200° F. | | Room Temp. | | 200° F. | Room Temp. | | 200° F. |
| Sample | STR (MPa) | MOD (GPa) | STR (MPa) | MOD (GPa) | STR (MPa) | MOD (GPa) | STR (MPa) | STR (MPa) | MOD (GPa) | STR (MPa) |
| Comparative Example | 1793 | 141.4 | 1855 | 144.8 | 1848 | 123.4 | 1069 | 81.38 | 7.45 | 71.03 |
| Example 1 | 1766 | 130.3 | 1828 | 146.2 | 2090 | 127.6 | 931 | 84.83 | 7.52 | 74.48 |
| Example 2 | 2034 | 141.4 | 1883 | 133.1 | 1586 | 122.1 | 979 | 66.21 | 8.83 | 71.03 |

Note:
Tensile and 0° Flexural data is normalized to 62 fiber volume percent in composite.
90° Flexural and short beam shear data listed as obtained.
STR and MOD denote strength and modulus, respectively.

It may therefore be seen that the inclusion of the ABS graft copolymer in the epoxy-based sizing composition (Examples 1 and 2) significantly enhances the impact strength of the composite articles produced from the sized carbon fibers. In addition, the other mechanical properties are not significantly impaired.

Although the invention has been described in conjunction with a preferred embodiment, it is to be understood that variations and modifications may be employed without departing from the concept of the invention as defined in the following claims.

We claim:

1. A carbon fiber having a coating on the surface thereof in a concentration of approximately 0.5 to 3.0 percent by weight based on the weight of the carbon fiber of a sizing composition which comprises as a first component an epoxy resin comprising the reaction product of epichlorohydrin and p-amino phenol and a second component consisting of an acrylonitrile butadiene-styrene graft copolymer.

2. The carbon fiber of claim 1 wherein said coating is present in a concentration of approximately 1.1 to 1.5 percent by weight.

3. The carbon fiber of claim 1 wherein said composition further comprises an additional epoxy resin formed by the reaction of epichlorohydrin and bisphenol.

4. The carbon fiber of claim 1 wherein said epoxy resin and said acrylonitrile butadiene-styrene graft copolymer are present in a weight ratio ranging from approximately 99:1 to 1:99.

5. The carbon fiber of claim 1 wherein said epoxy resin and said acrylonitrile butadiene-styrene graft copolymer are present in a weight ratio ranging from approximately 4:1 to 1:4.

6. A composite structure comprising a rigid polymeric matrix having carbon fibers incorporated therein which are coated on the surface thereof with approximately 0.5 to 3.0 percent by weight based on the weight of the carbon fibers of a sizing composition which comprises as a first component an epoxy resin comprising the reaction product of epichlorohydrin and p-amino phenol and a second component consisting of an acrylonitrile butadiene-styrene graft copolymer.

7. The composite article of claim 6 wherein said coating is present in a concentration of approximately 1.1 to 1.5 percent by weight.

8. The composite article of claim 6 wherein said composition further comprises an additional epoxy resin formed by the reaction of epichlorohydrin and bisphenol.

9. The composite article of claim 6 wherein said epoxy resin and said acrylonitrile butadiene-styrene graft copolymer are present in a weight ratio ranging from approximately 99:1 to 1:99.

10. The composite article of claim 6 wherein said epoxy resin and said acrylonitrile butadiene-styrene graft copolymer are present in a weight ratio ranging from approximately 4:1 to 1:4.

11. The composite article of claim 6 comprising approximately 50 to 75 percent by weight of said carbon fibers.

12. The composite article of claim 6 comprising approximately 60 to 65 percent by weight of said carbon fibers.

* * * * *